H. C. BAILEY.
SPRING TIRE.
APPLICATION FILED JAN. 16, 1914.
1,123,466.
Patented Jan. 5, 1915.
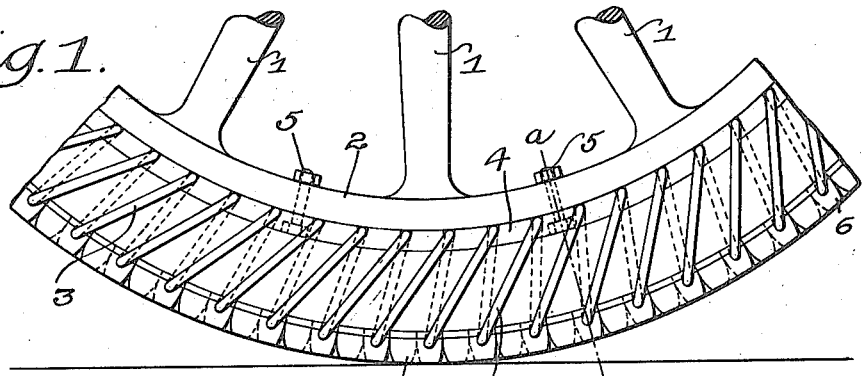
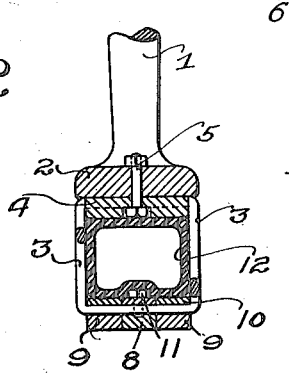
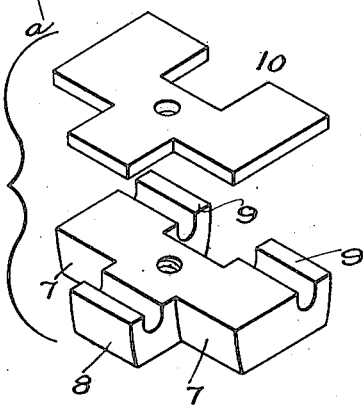
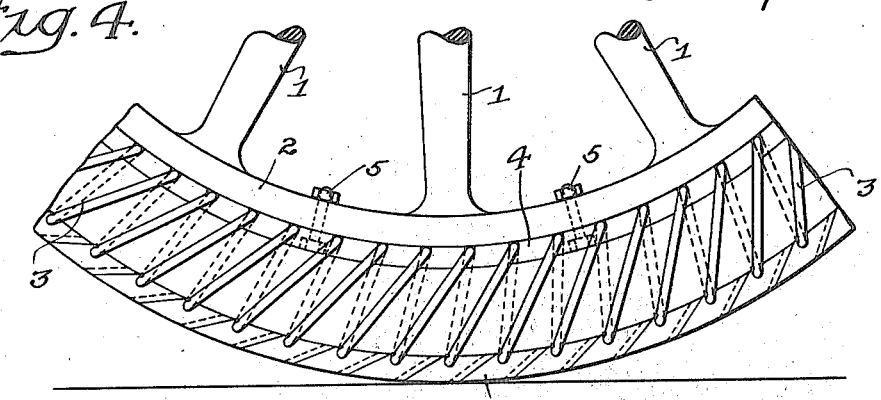
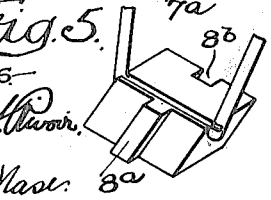
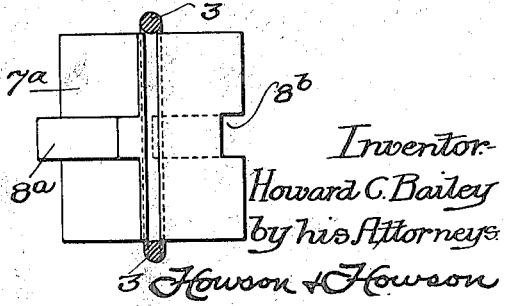
Witnesses
William B. Oliver
William T. Nase
Inventor
Howard C. Bailey
by his Attorneys
Howson & Howson

UNITED STATES PATENT OFFICE.

HOWARD C. BAILEY, OF DOWNINGTOWN, PENNSYLVANIA.

SPRING-TIRE.

1,123,466.  Specification of Letters Patent.  Patented Jan. 5, 1915.

Application filed January 16, 1914. Serial No. 812,507.

*To all whom it may concern:*

Be it known that I, HOWARD C. BAILEY, a citizen of the United States, residing in Downingtown, Chester county, Pennsylvania, have invented certain Improvements in Spring-Tires, of which the following is a specification.

One object of my invention is to provide a practical, inexpensive and relatively substantial, as well as simple form of spring tire, whose construction shall be such as to cause it under operating conditions to be exceedingly durable and economical.

I further desire to provide a spring tire which, in addition to possessing the above noted characteristics, shall be easy to inspect and repair, shall be of such a nature as to prevent the transmission of injurious shocks to the axle on which it is mounted, and which shall be provided with novel means for excluding gravel, dirt, etc., from its interior portions.

Another object of the invention is to provide a novel form of resilient structure which may be quickly and conveniently applied to or removed from the felly of a wheel.

These objects and other advantageous ends I secure as hereinafter set forth, reference being had to the accompanying drawings, in which:—

Figure 1 is a side elevation of a portion of a tire constructed according to my invention; Fig. 2 is a transverse section on the line *a—a*, Fig. 1; Fig. 3 is a detached perspective of one of the links going to make up the tread surface of my tire; Fig. 4 is a side elevation of a portion of a slightly modified form of my invention, Figs. 5 and 6 are respectively a perspective view and a plan of one of the links used with that form of the invention shown in Fig. 4, and Fig. 7 is a side elevation of a link to which two spring convolutions are connected.

In the above drawings, 1 represents the spokes of a wheel, which are attached to or are formed as part of a rim or felly 2. A helical spring coil 3 has its ends connected together so that as a whole it has an annular form and is fitted upon the outer surface of this rim, its convolutions being, in front elevation, substantially rectangular in outline as illustrated in Fig. 2 so that each of them includes an inner part which for most of its length may be in contact with said rim. In addition to the above features, the convolutions of this spring coil are so formed that they all bend or lean in the same direction around the wheel, so that when any force is exerted upon the coil which would tend to compress it toward the spokes, these convolutions naturally all fall over or approach the rim 2 to a greater or less extent, depending upon the magnitude of the force, and their own arrangement and design.

For holding the coil in place upon the rim 2, I fit to the latter a suitably recessed retaining ring 4 which is formed with a series of transversely extending grooves for the reception of the innermost parts of the convolutions. By this means said coil is not only retained in position but has its convolutions accurately and permanently spaced apart the proper predetermined distance for most efficient operation. The retaining ring 4 is held to the felly 2 by a series of bolts of which several are indicated at 5.

Each of the transversely extending outer portions of the various convolutions of the coil 3 has mounted upon it a link 6 of an endless chain which extends completely around the wheel, it being noted that the various links of this chain, as shown in Fig. 3, preferably each consists of a plate or block 7, preferably formed with a single projecting lug 8 at the central part of one end and two similar projecting lugs 9 at the other end. These sets of projecting lugs are complementary, since the space between the lugs 9 is such that the lug 8 of another link fits snugly between them. The various links with their edges rounded as illustrated are thereafter connected into an endless chain forming the tread surface of the wheel, by means of the outer transverse portions of the various convolutions of the coil 3, which portions serve as pintles or pivot pins for said chain. I, therefore, preferably so design the coil and the chain links that there are as many of said links as there are convolutions though in some cases there may be more convolutions than links. For holding the parts in place, I provide each link with a cover plate 10 having substantially the same outline and held in place by a screw or bolt 11 as shown in Fig. 2, or by any other suitable device.

With the above described arrangement of parts, the tread surface of the wheel is formed by an articulated structure made of the endless plate or link chain which is yieldingly supported on the coiled spring 3, and under conditions of use this latter, owing to the inclination of its convolutions, will yield to a greater or less extent depending upon its design as well as on the load, serving to absorb shocks due to the irregularities of the roadway or to the wheel being driven over objects of any kind.

In order to prevent stones or foreign material from lodging within the convolutions of the spring, I may fill its hollow interior with a suitably formed body of material, such, for example, as an endless rubber tube 12 of rectangular or any other desired section. This is usually not inflated, and it may be made of any desired structural strength, although it is preferably made of such construction as to assist the coiled spring 3 to a greater or less extent, in supporting the load.

While I preferably use a positive connection between the adjacent ends of the various links forming the tread surface of my wheel, I may, as shown in Figs. 4 to 6 inclusive, cause the convolutions of the spring coil 3 to engage the link sections 7ª at points other than their ends, and for this purpose form each of said sections with a transversely extending undercut groove, whose top edges overhang the transverse portion of the convolution fitting therein. In order to permit of the removal of each section from the part of the spring on which it is mounted, I notch one of the side portions of each convolution immediately adjacent its link engaging portion, as shown in Fig. 5. With this construction, when the link section 7ª is so turned on the transverse part of its supporting spring convolution as to bring its inner surface substantially perpendicular with the general line of the notched side of the convolution, it may be moved laterally off of said supporting part, since the overhung edges of its groove pass out through the notches 13. In this case the engaging ends of the various tread sections are beveled or inclined to the general plane of the inner and outer faces and one end of each section is provided with a tongue 8ª, while the other has a complementary groove 8ᵇ, designed to receive the tongue of the end link next adjacent.

Under conditions of use, the series of sections as before serves to provide a wearing structure for the wheel and is yieldingly supported by the coiled spring 3, either with or without an inner supporting structure 12, as may be considered advisable. When the abutting ends of the links are not positively connected, I preferably connect each link to at least two convolutions of the spring coil as shown in Fig. 7 in order to prevent its undue revolution or accidental displacement.

I claim:—

1. The combination of a rim, a circumferentially disposed coiled spring mounted thereon and having portions of its convolutions straight and formed to lie substantially parallel to the axis of the wheel, and a series of plates each formed with a recess and a complementary projection, said plates being grooved for the reception of said straight portions of the convolutions.

2. The combination of a rim, a circumferentially disposed coiled spring mounted thereon and having portions of its convolutions substantially straight and formed to lie substantially parallel to the axis of the wheel, a series of plates each formed with a centrally disposed recess and a centrally disposed complementary projection respectively at its opposite ends, said plates being transversely grooved at each side of said recess and said projection being transversely grooved and said grooves being normally open to receive the straight portions of the convolutions of the spring.

3. The combination of a rim, a circumferentially disposed coiled spring mounted thereon and having portions of its convolutions substantially straight and formed to lie substantially parallel to the axis of the wheel, a series of plates each formed with a centrally disposed recess and a centrally disposed complementary projection respectively at its opposite ends, said plates being transversely grooved at each side of said recess, and said projection being transversely grooved and said grooves being normally open to receive the straight portions of the convolutions of the spring, said convolutions being inclined to the radius of the rim and each of the convolutions being inclined in the same direction.

In testimony whereof, I have signed my name to this specification in the presence of two subscribing witnesses.

HOWARD C. BAILEY.

Witnesses:
 WILLIAM E. BRADLEY,
 JOS. H. KLEIN.